United States Patent
Meads et al.

(10) Patent No.: US 10,575,348 B2
(45) Date of Patent: Feb. 25, 2020

(54) ONLINE PEER-TO-PEER COMMUNICATION FOR ACCELERATED DATA TRANSMISSION

(71) Applicant: ASSA ABLOY AB, Stockholm (SE)

(72) Inventors: Adrian Meads, Basingstoke (GB); Anders Wallbom, Stockholm (SE); Uwe Schnabel, Erfurt (DE); Philip Hoyer, Richmond (GB)

(73) Assignee: ASSA ABLOY AB, Stockholm (SE)

(*) Notice: Subject to any disclaimer, the term of this patent is extended or adjusted under 35 U.S.C. 154(b) by 135 days.

(21) Appl. No.: 15/723,770

(22) Filed: Oct. 3, 2017

(65) Prior Publication Data

US 2018/0098364 A1  Apr. 5, 2018

Related U.S. Application Data

(60) Provisional application No. 62/403,540, filed on Oct. 3, 2016.

(51) Int. Cl.
| | |
|---|---|
| *H04J 3/16* | (2006.01) |
| *H04W 76/11* | (2018.01) |
| *H04L 29/08* | (2006.01) |
| *H04W 76/14* | (2018.01) |
| *H04W 92/18* | (2009.01) |
| *H04W 4/80* | (2018.01) |

(52) U.S. Cl.
CPC ............ *H04W 76/11* (2018.02); *H04L 67/02* (2013.01); *H04L 67/06* (2013.01); *H04L 67/146* (2013.01); *H04W 76/14* (2018.02); *H04W 4/80* (2018.02); *H04W 92/18* (2013.01)

(58) Field of Classification Search
None
See application file for complete search history.

(56) References Cited

U.S. PATENT DOCUMENTS

| 8,616,439 B1* | 12/2013 | Azen ................. G06Q 30/00 235/375 |
|---|---|---|
| 10,079,790 B2* | 9/2018 | Ghannam ............ H04L 51/10 |
| 2008/0137856 A1* | 6/2008 | Ja Beom ............. G06F 21/33 380/255 |
| 2009/0075642 A1* | 3/2009 | Rantapuska .......... H04W 88/02 455/422.1 |
| 2011/0016220 A1* | 1/2011 | Desai ................ H04L 67/104 709/230 |
| 2011/0137986 A1* | 6/2011 | Wolf ................. G06F 16/958 709/204 |
| 2011/0289156 A1* | 11/2011 | Pirnazar .............. H04L 67/02 709/206 |
| 2014/0073244 A1* | 3/2014 | Ko .................... H04W 76/14 455/41.1 |
| 2015/0095352 A1* | 4/2015 | Lacey ................. G06Q 20/02 707/752 |

(Continued)

*Primary Examiner* — Kwang B Yao
*Assistant Examiner* — Juvena W Loo
(74) *Attorney, Agent, or Firm* — Schwegman Lundberg & Woessner, P.A.

(57) ABSTRACT

A method and system for facilitating machine-to-machine communications at an improved communication rate is provided. An illustrative system is disclosed to include a transmitting device, a requesting device, and a communication server that helps facilitate an online exchange of data between the transmitting device and requesting device by using information exchanged directly between the transmitting device and receiving device.

20 Claims, 6 Drawing Sheets

(56) References Cited

U.S. PATENT DOCUMENTS

| | | | |
|---|---|---|---|
| 2015/0237143 A1* | 8/2015 | Sinn | H04W 4/21 709/227 |
| 2016/0021007 A1* | 1/2016 | Shuman | H04W 76/23 370/235 |
| 2016/0150426 A1* | 5/2016 | Panaitopol | H04W 24/08 370/252 |
| 2017/0070919 A1* | 3/2017 | Verger | H04L 65/1083 |
| 2017/0250859 A1* | 8/2017 | Gheorghe | H04L 41/0803 |
| 2017/0280493 A1* | 9/2017 | Aminaka | H04W 92/18 |
| 2018/0262966 A1* | 9/2018 | Yoshimura | H04M 11/00 |

* cited by examiner

ONLINE PEER-TO-PEER COMMUNICATION FOR ACCELERATED DATA TRANSMISSION

CROSS REFERENCE TO RELATED APPLICATIONS

Pursuant to 35 U.S.C. § 119(e), the present application claims the benefit of and priority to U.S. Provisional Application Ser. No. 62/403,540, filed on Oct. 3, 2016, the entire disclosure of which is hereby incorporated by reference, in its entirety, for all that it teaches and for all purposes.

FIELD

The present disclosure is generally directed to machine-to-machine communications and methods for efficiently facilitating the same.

BACKGROUND

For the purpose of electronic Identifications (IDs) such as electronic driver's licenses issued by a distributed system, there is a need to transfer data from one device to another. For instance, there may arise a need for a person carrying an electronic driver's license to share that information with a police officer, security guard, or the like for verification. At the moment, most systems perform this function with device-to-device communications using Bluetooth® Low Energy (BLE) technology. However, BLE technology is deemed quite slow for this purpose.

SUMMARY

Embodiments of the present disclosure aim to overcome the shortcomings associated with the limited speed of transmitting data across a proximity-based or peer-to-peer connection. In particular, embodiments of the present disclosure relate to switching from a traditional local device-to-device communications protocol (such as BLE, NFC or a suitable alternative) to use an Internet-based (e.g., Cellular network or WIFI) mechanism of communication (e.g., HTTP/HTTPS) in order to accelerate the transmission of data.

The proposed system includes the following components:
- A transmitting device (e.g., a mobile device, smartphone, etc.) that wishes to transmit data to a requesting device. In the context of a mobile driver's license scenario, this would be a citizen's device.
- A requesting device (e.g., a mobile device) that wishes to receive the data from the transmitting device. In the context of a mobile driver's license scenario, this would be a verifier device.
- A communication server that is available on the Internet and can relay information between the two Internet-connected devices The suggested process for communication proceeds by performing a handshake process between the two devices. In some embodiments, the requesting device starts to listen for data using a traditional local device-to-device communications technology (e.g., BLE, NFC or another suitable alternative).

The transmitting device starts to communicate with the requesting device using the same local device-to-device communications technology (e.g., BLE, NFC or another suitable alternative).

If the transmitting device has an online connection and believes that the online connection is faster than the local device-to-device connection, the transmitting device can choose to instruct the requesting device to switch to an Internet peer-to-peer session (using a technology such as HTTP/HTTPS) and will provide the information necessary for this purpose as part of the initial handshake. In some embodiments, the information sent from the transmitting device to the requesting device is formatted in one or more Application Protocol Data Units (APDUs), which are a communication unit employed between smart card readers and smart cards. The structure of the APDU may be defined in accordance with ISO/IEC 7816-4, the entire contents of which are hereby incorporated herein by reference.

The process of sharing data between the devices continues with a data-sharing step. In this step, the requesting device will now start sending requests for data using the Internet communications channel (using a technology such as HTTP/HTTPS). The requesting device will use the knowledge obtained during the handshake (e.g., the session ID) to select the correct communications channel/session on the server for this purpose. In one embodiment, the requesting device will wait for a response from the communication server. In another, the requesting device will not wait, but rather will begin polling the communication server for a possible response from the transmitting device (using the session identifier).

One example of this is that the two devices will setup a secure communication channel based on a mutual authentication protocol. For example, HID Seos, HID Seos AKE, OPACITY or others. In these protocols one of the first steps is normally to send a Random Nonce N generated from one device to the other. (In the example, the Nonce is sent from the transmitting device to the requesting device). In one embodiment, this step is still performed on the local proximity protocol (e.g., Bluetooth Smart/BLE, NFC, etc.). The nonce N is then used on the requesting device in the communication with the communication server to identify the transmitting device (and the logical communication session used to transmit the nonce N).

The request is sent from the requesting device to the communication server along with the Nonce. The server is polled by the transmitting device, who receives the request based on the match of the Nonce at the communication server.

Now that both devices have coordinated/negotiated a second communication channel via the nonce N, the transmitting device can begin transmitting data using the secure online communications channel (e.g., using a technology such as HTTP/HTTPS). The transmitting device will use the knowledge from the handshake to select the correct communications channel/session on the server for this purpose and the requesting device will also know how to negotiate toward the same communications channel/session.

These steps can be repeated until either all communications have been successfully completed or a non-recoverable communication error has occurred.

The proposed approach is designed to accelerate the communication rate between the two devices by using a faster Internet connection rather than just using the local device-to-device connection alone.

By employing the communications described herein, the machine-to-machine communication rate realize a significantly improved performance over using local device-to-device communications technologies alone (such as BLE). Furthermore, the proposed solution provides a seamless switching of technologies without the need for user interaction. In the direct peer-to-peer mode no keys are ever held in the communications server. The security paradigm is still based on two devices holding keys and transmitting data (verifying a credential on a mobile driver's license scenario) between them. This results in a highly secure and reliable communication mechanism.

The basic structure described herein can be further extended. In one extension, the same process of the initial handshake is performed as described above. But instead of completely switching the communication channel to the Internet connection, the devices (assumed to have sufficient processing capabilities) will also continue the transmission over the proximity interface (e.g., via BLE, NFC, etc.). Whichever transmission that completes first will be used to verify the credential that is transmitted within the established secure channel.

This way, in case requesting (verifier) and transmitting (credential carrying) device have faulty network connections, the user experience still has the fallback that the slower BLE or NFC-based transmission can be used.

In another extension of the basic concept described herein, the transmitting (e.g., credential) device utilizes a similar process to the one described above but the security protocol (secure channel protocol) is not terminated on the requesting (verifier) device but rather with a specific component embedded within the communication server: security bridge component).

The requesting device to receive the data will have authenticated to the communication server via some other means such as One Time Password (OTP), PKI, FIDO or a combination thereof. And as described would have identified the communication session. In some embodiments a secure channel will have been established between the requesting device and the security bridge component or the communication server. This could be simply Server Side SSL or a more sophisticated secure channel protocol.

The security bridge component would then effectively be the endpoint of the mutual authentication/secure channel protocol to the transmitting device but relay the data transmission to the requesting device re-encrypting it with keys for the channel established with the requesting In addition to the process described above, another extension (alone or in combination with other extensions described herein) relates to bypassing the local device-to-device handshake process and to manually key-in a code to initiate the online peer-to-peer communication process. This is particularly useful if the two devices are not within range for the local device-to-device technology to be used.

The above approach could be used by both mobile devices and other Internet connected devices (such as web browsers). The suggested process for communication would then be as follows:

Stage One—Remote Manual Handshake Process

The user of the transmitting device starts a remote connection. As part of this process, a human readable code will be displayed (this might contain a check digit). This can then be informed to the user of the requesting device (e.g., orally/audibly over a phone connection).

The user of the requesting device then enters the human readable code in order to initiate communications with the transmitting device (If a check code was present the requesting device would check this first before using the human readable code at the communication server).

Stage Two—Main Communication Process (Similar to Before)

The requesting device will now start to listen for data using the online communications channel (using a technology such as HTTP/HTTPS). The requesting device will use the user entered code to select the correct communications channel/session on the server for this purpose. In another embodiment the human readable code is first passed into a password based key derivation function such as PKDF2 and the resulting key or part of it would represent the identifier of the correct channel/session on the server.

The transmitting device will now start to transmit data using the online communications channel (using a technology such as HTTP/HTTPS). It will use the user entered code to select the correct communications channel/session on the server for this purpose.

These steps can be repeated until either all communication has been successfully completed or a non-recoverable communication error has occurred.

An advantage of using this extension is that the faster connection can be used when the local device-to-device technology is not available or is out of range. The process can have the two devices situated remotely from one another (e.g., in a completely different location). Furthermore, the proposed extension can be used by both mobile devices and other technologies such as a web browser. In the context of a mobile driver's license scenario, this also provides an alternative to other authentication technologies such as a One Time Password (OTP).

The terms "memory," "computer memory," "computer-readable medium," and "computer-readable storage medium," as used herein, refer to any tangible data storage medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read instructions. When the computer-readable medium is configured as part of a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein, "credentials," "access credentials," or "credential information" refer to any data, set of data, encryption scheme, key, and/or transmission protocol carried by a particular device (e.g., a "credential device," a "mobile device," or a "wearable device") to authenticate and/or to verify its authenticity or access authorization with a reader, mobile device, and/or interrogator.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine," "calculate," and "compute," and variations thereof, as used herein, are used interchangeably and include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Copyright and Legal Notices

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

According to one embodiment of the present disclosure, a method for exchanging data between a transmitting device and a requesting device is provided, the method comprising:

the transmitting device first transmitting a session identifier to the requesting device via a device-to-device communication protocol;

the transmitting device transmitting a request for a communication session to the communication server, wherein the request for the communication session includes the session identifier;

the transmitting device transmitting a data payload to the communication server via the communication session;

the requesting device issuing a request for the data payload to the communication server, wherein the request is formatted in an Internet Protocol (IP) format and includes the session identifier as a mechanism for identifying the data payload; and the requesting device receiving the requested data payload from the communication server in response to the communication server confirming that the session identifier received from the requesting device matches the session identifier received from the transmitting device.

In some embodiments, the method further comprises the transmitting device also transmitting the data payload directly to the requesting device via the device-to-device communication protocol.

In some embodiments, the session identifier is transmitted to the requesting device in an Application Protocol Data Unit (APDU).

In some embodiments, the transmitting device and requesting device both comprise cellular communication capabilities.

In some embodiments, the device-to-device communication protocol comprises NFC and/or BLE.

In some embodiments, the request issued by the requesting device comprises an HTTP GET request.

In some embodiments, the session identifier comprises a random nonce value generated by the transmitting device. The random nonce value may identify the communication session between the transmitting device and the communication server as well as between the requesting device and the communication server thereby creating a secure communication channel between the transmitting device and the requesting device through the communication server.

In some embodiments, the method further comprises the transmitting device polling the communication server to receive the session identifier received at the communication server from the requesting device, thereby confirming that the communication server received the session identifier from the requesting device that is communicating with the transmitting device.

In some embodiments, the data payload comprises an electronic driver's license or some other form of electronic identification (e.g., electronic passport, electronic ticket, etc.).

In some embodiments, the method further comprises generating a human-readable version of the session identifier for display on the transmitting device.

Figure 1:
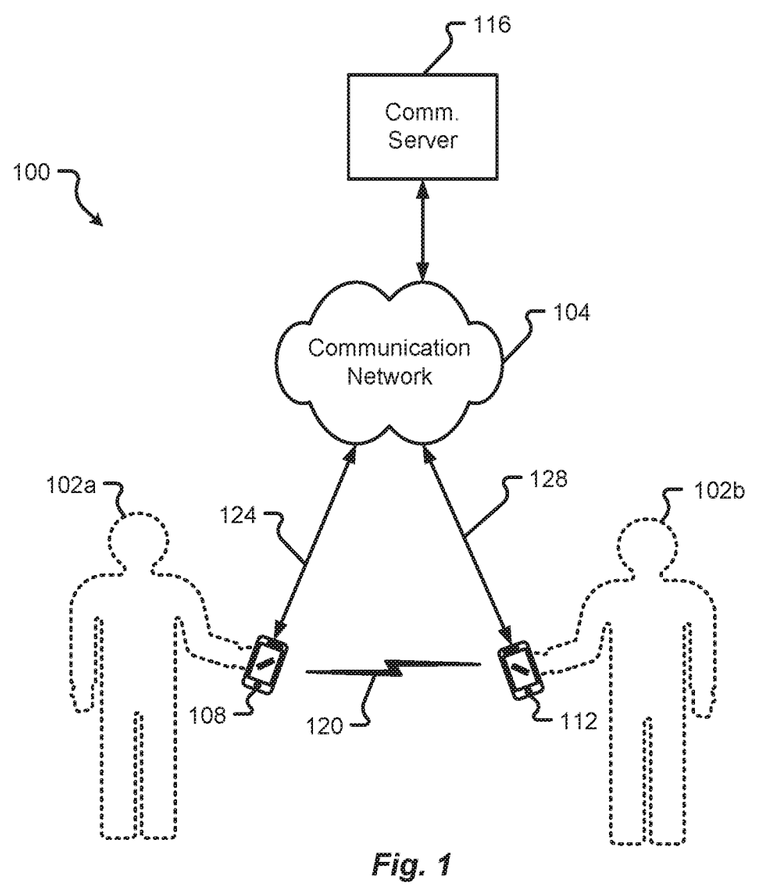
FIG. 1 is a diagram depicting a communication system in accordance with embodiments of the present disclosure.

With reference now to FIG. 1, additional details of a communication system 100 and the components used therein to exchange information between electronic communication devices will be described in accordance with at least some embodiments of the present disclosure. The communication system 100 is shown to include a communication network 104 that facilitates communications between a first mobile device 108, a second mobile device 112, and a communication server 116. In some embodiments, the first mobile device 108 and second mobile device 112 may correspond to a similar or same type of device (e.g., a mobile communication device, a smartphone, a laptop, a tablet, a wearable device, etc.), but the devices 108, 112 may be carried by different users 102a, 102b. In particular, the first mobile device 108 may be carried by the first user 102a whereas the second mobile device 112 may be carried by the second user 102b. As will be discussed in further detail herein, one of the mobile devices 108 may assume the role of a requesting device (also referred to as a verifying device) whereas the other mobile device 112 may assume the role of a transmitting device. It should be appreciated that the role assumed by the devices 108, 112 may depend upon the interactions between the users 102a, 102b and the respective roles thereof. As a non-limiting example, the first mobile device 108 may correspond to a requesting device that is carried by first user 102a acting in a capacity of a police officer, a security guard, etc. On the other hand, the second mobile device 112 may correspond to a transmitting device carried by a person 102b wishing or needing to provide some amount of information about themselves to the first user 102a. As a more specific non-limiting example, the first user 102a may wish to verify that an electronic ID of the second user 102b that is carried or stored in memory of the transmitting device 112. In such a scenario, the second user 102b may transmit some or all information about their electronic ID from their mobile device 112 to the mobile device 108 of the first user 102a, thereby enabling the first user 102a to verify some or all information contained in the electronic ID.

In some embodiments, the exchange of data between devices 108, 112 may be achieved by using a direct device-to-device communication protocol, such as BLE, NFC, etc. As shown in FIG. 1, a first wireless connection 120 may be established between the devices 108, 112 to facilitate the device-to-device exchange of data. However, circumstances may arise where the first wireless connection 120 does not provide a sufficient or desirable data exchange rate (e.g., has a limited bandwidth or connection speed). In such a situation, the devices 108, 112 may be better served to continue exchanging data between one another via a non-direct connection (e.g., through a communication path that includes the communication network 104 and the communication server 116). Thus, as will be described in further detail herein, the devices 108, 112 may establish respective connections with the communication server 116 via the communication network 104 and a secured and high-speed communication channel may be established between the devices 108, 112 through the communication network 104. Establishment and utilization of such a communication channel may be counterintuitive as most communication systems would suggest a preference for direct device-to-device connections for the exchange of data. However, embodiments of the present disclosure appreciate that communication links 124, 128 established between the devices 108, 112 and the communication network 104 may be higher-speed/higher bandwidth as compared to the first wireless connection 120. The nature of the communication links 124, 128 may depend upon the nature of the communication network 104 and devices 108, 112. As a non-limiting example, the communication links 124, 128 may utilize one or more WiFi communication standards (e.g., an 802.11N protocol). Alternatively or additionally, a high-speed cellular communication protocol such as LTE, 3G, 4G, 5G, or the like may be used for communication links 124, 128.

The connection between the communication server 116 and communication network 104 may correspond to a wired connection and any type of IP-based communication protocol may be supported by the wired connection. In some embodiments, an Ethernet connection is used between the communication server 116 and communication network 104.

The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, RS-232, RS-485, similar networks used in access control systems between readers and control panels, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

The communication server 116 may include a processor, a memory, and one or more inputs/outputs (e.g., network interfaces). As an illustrative but non-limiting example, the communication server 116 may include a plurality of microprocessors and computer memory devices operated on a server or a collection of servers. The memory of the communication server 116 may be used in connection with the execution of application programming or instructions by the processor, and for the temporary or long term storage of program instructions and/or data. As examples, the memory may comprise RAM, DRAM, SDRAM, or other solid state memory.

Figure 2:
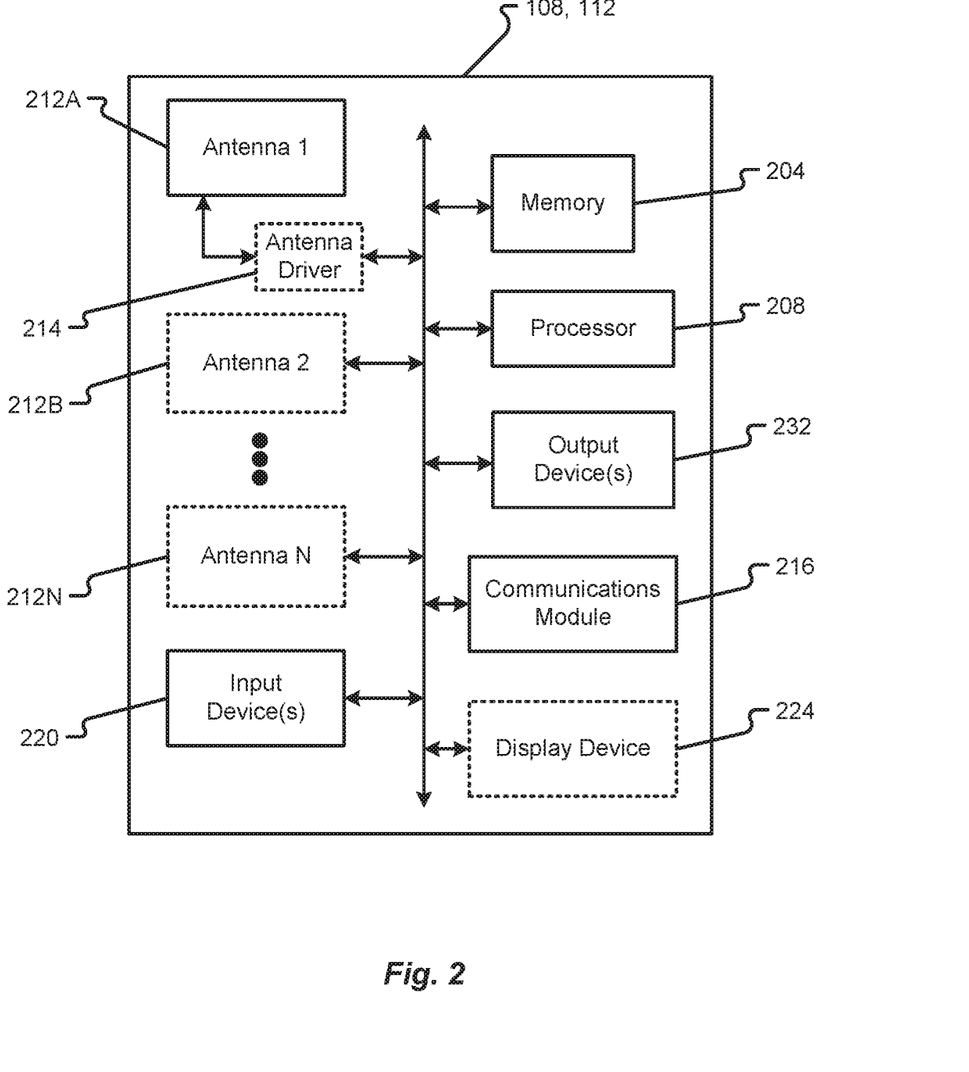
FIG. 2 is a block diagram depicting a mobile device or components thereof in accordance with embodiments of the present disclosure.

Referring now to FIG. 2, a block diagram depicting a mobile device 108, 112 is shown in accordance with embodiments of the present disclosure. The mobile device 108, 112 may include one or more components, such as, a memory 204, a processor 208, an antenna 212A-N, a communications module 216, one or more input devices 220, and one or more display devices 224. In some embodiments, the mobile device 108, 112 may further include a power module. As can be appreciated, the mobile device 108, 112 may be configured to exchange information/data with other mobile devices 108, 112 either via a direct machine-to-machine communication or through a communication network 104.

The memory 204 of the mobile device 108, 112 may be used in connection with the execution of application programming or instructions by the processor 208, and for the temporary or long term storage of program instructions and/or data. The memory 204 may contain executable functions that are used by the processor 208 to run other components of the mobile device 108, 112. In one embodiment, the memory 204 may be configured to store credential information, information related to an electronic ID (e.g., pictures, Personally Identifiable Information (PII), etc.). For instance, the credential information or electronic ID information may include, but is not limited to, unique identifications, names, birthdates, ID expiration dates, addresses, manufacturer identification, passwords, keys, encryption schemes, transmission protocols, and the like. In some embodiments, the memory 204 may be configured to store configuration information, identification information, authentication information, and/or the like. In some embodiments, the memory 204 may comprise volatile or non-volatile memory and a controller for the same. Non-limiting examples of memory 204 that may be utilized in the mobile device 108, 112 include RAM, ROM, buffer memory, flash memory, solid-state memory, or variants thereof.

The processor 208 may correspond to one or many microprocessors that are contained within the housing of the mobile device 108, 112 with the memory 204. In some embodiments, the processor 208 incorporates the functions of the user device's Central Processing Unit (CPU) on a single Integrated Circuit (IC) or a few IC chips. The processor 208 may be a multipurpose, programmable device that accepts digital data as input, processes the digital data according to instructions stored in its internal memory, and provides results as output. The processor 208 implements sequential digital logic as it has internal memory. As with most known microprocessors, the processor 208 may operate on numbers and symbols represented in the binary numeral system.

The one or more antennas 212A-N may be configured to enable wireless communications between the mobile device 108, 112 and other mobiles devices and/or with the communication network 104. As can be appreciated, the antenna(s) 212A-N may be arranged to operate using one or more wireless communication protocols and operating frequencies including, but not limited to, Bluetooth®, NFC, Zig-Bee, GSM, CDMA, WiFi, RF, and the like. By way of example, the antenna(s) 212A-N may be RF antenna(s), and as such, may transmit RF signals through free-space to be received by a network access point (e.g., a WiFi access point, a cellular tower, etc.). One or more of the antennas 212A may be driven or operated by a dedicated antenna driver 214. In one embodiment, a first antenna 212A may be used to establish wireless connection 120 whereas another antenna 212B may be used to establish a communication link 124 or 128. Thus, the mobile device 108, 112 switching from one type of communication link to another communication link may invoke the use of different antennas and/or antenna drivers for such a transition.

In some embodiments, the mobile device 108, 112 may include a power module. The power module may be configured to provide power to the parts of the mobile device 108, 112 in order to operate. The power module may store power in a capacitor of the power module. In one embodiment, electronics in the power module may store energy in the capacitor and turn off when an RF field is present. This arrangement can ensure that energy is presented to the mobile device 108, 112 minimizing any effect on read distance. Although the mobile device 108, 112 may be configured to receive power passively from an electrical field of another mobile device 108, 112, it should be appreciated that the mobile device 108, 112 may provide its own power. For example, the power module may include a battery or other power source to supply power to parts of the mobile device 108, 112. The power module may include a built-in power supply (e.g., battery) and/or a power converter that facilitates the conversion of externally-supplied AC power into DC power that is used to power the various components of the mobile device 108, 112. In some embodiments, the power module may also include some implementation of surge protection circuitry to protect the components of the mobile device 108, 112 from power surges.

The mobile device 108, 112 may include a communications module 216 that is configured to communicate with one or more different systems or devices either remotely or locally to the mobile device 108, 112. Thus, the communications module 216 can send or receive messages to or from other devices 108, 112, the communication server 116, or the like. In some embodiments, the communicated information may be provided to, or exchanged with, other components within the mobile device 108, 112.

The input device(s) 220 may include at least one device sensor. Among other things, a device sensor may be configured to detect a state of the mobile device 108, 112 or location of the mobile device 108, 112. Illustrative but non-limiting sensors include one or more biometric sensors (e.g., heart rate, body temperature and/or heat signature, blood pressure, etc.), capacitive sensors, light sensors, image sensors, temperature sensors, pressure sensors, contact sensors, magnetic sensors, radio indoor positioning sensors, location services sensors and/or devices, combinations thereof, and the like. One type of suitable sensor that can be included in the input device(s) 220 is a location sensor. A location sensor may be configured to determine a geographical location and/or position of the mobile device 108, 112. In one embodiment, this location may be based on Global Positioning System (GPS) data provided by a GPS module of the mobile device 108, 112. In some embodiments, the location of the mobile device 108, 112 may be provided based on cell tower data, WiFi information, iBeacon information, and/or some other location information provided by a location module and/or a communications module 216 of the mobile device 108, 112.

In some embodiments, the mobile device 108, 112 may include a user interface. The user interface may or may not include one or more input devices 220 and/or display devices 224. Examples of suitable user input devices that may be included in the user interface include, without limitation, buttons, keyboards, mouse, touch-sensitive surfaces, pen, camera, microphone, etc. Examples of suitable user output devices that may be included in the user interface include, without limitation, display screens, touchscreens, lights, speakers, etc. It should be appreciated that the user interface may also include a combined user input and user output device, such as a touch-sensitive display or the like.

As mentioned above, one or more of the antennas 212A-N may correspond to a communication network interface whereas others of the antennas 212A-N may correspond to a wireless machine interface. A wireless machine interface may include a Bluetooth interface (e.g., antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). A communication network interface, on the other hand, may include a Wi-Fi/802.11N interface (e.g., an antenna and associated circuitry), an Ethernet port, a Network Interface Card (NIC), a cellular interface (e.g., antenna, filters, and associated circuitry), or the like. The network interface may be configured to facilitate a connection between the mobile device 108, 112 and the communication network 104 and may further be configured to encode and decode communications (e.g., packets) according to a protocol utilized by the communication network 104.

If NFC is being used for the communication channel, then the mobile device 108, 112 may have its interface/antenna inductively coupled to another interface/antenna of another mobile device 108, 112 and this connection will allow the devices to authenticate or mutually authenticate with one another. Following authentication, one mobile device may request keys from the other mobile device or one mobile device may offer a key or multiple keys to the other mobile device. These key(s) may be used to secure the communications exchanged over wireless connection 120.

If, for instance, BLE is being used for the communication channel, then devices may perform a discovery routine prior to pairing with one another or otherwise connecting to establish the wireless connection 120. After the link 120 is established, however, the devices 108, 112 may then authenticate one another and exchange relevant information, such as the key(s) to facilitate secure communications.

Figure 3:
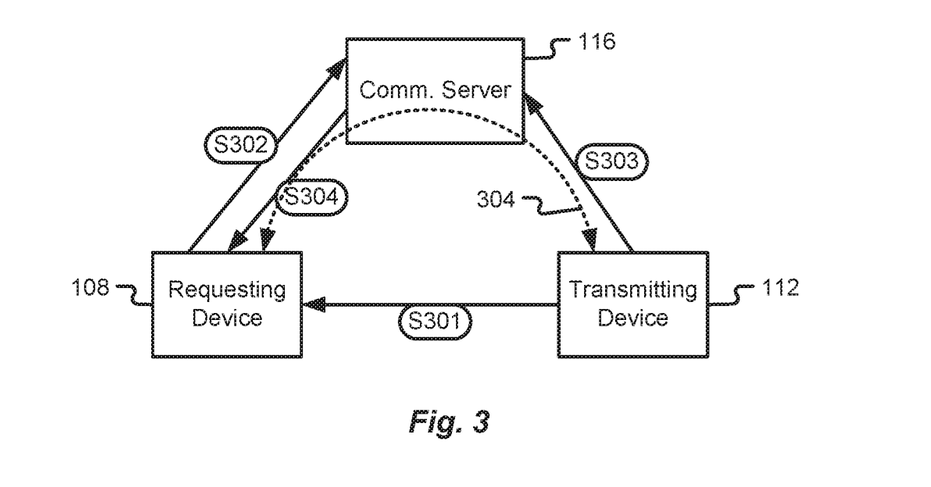
FIG. 3 is a block diagram depicting a first message flow in accordance with embodiments of the present disclosure.

With reference now to FIG. 3, additional details of a message flow between the mobile devices 108, 112 will be described in accordance with at least some embodiments of the present disclosure. The process begins with the first mobile device (e.g., the requesting device) 108 and the second mobile device (e.g., the transmitting device) 112 establishing a direct machine-to-machine communication interface (e.g., via wireless connection 120). At some point, the transmitting device 112 may transmit or indicate a desire to transmit data to the requesting device 108. When this occurs, one or both devices may determine (without receiving user input) that the wireless connection 120 is undesirably slow to facilitate the full exchange of such data. Accordingly, a process may be initiated where an alternative communication path is established between the devices 108, 112 through the communication network 104 and communication server 116. In particular, the process begins with the transmitting device 112 sending a session identifier (e.g., session ID) or similar information directly to the requesting device 108 over wireless connection 120 (step S301). More specifically, the transmitting device 112 may share a session ID with the requesting device that includes a Nonce value of a partial secure channel handshake. In some embodiments, the session ID information is sent to the requesting device 108 in one or more APDUs as defined by ISO/IEC 7816-4.

The requesting device 108, in response to receiving the session ID information from the transmitting device 112, will begin a process of establishing an online communication channel that flows through the communication server 116. In particular, the requesting device 108 will send one or more requests for data to the communication server 116 using an IP-based communication protocol (e.g., HTTP/HTTPS) (step S302). The requesting device 108 may also provide the communication server 116 with some or all of the session ID information received from the transmitting device 112 to help select the appropriate communication channel/session on the communication server 116.

Meanwhile, thereafter, or simultaneous with step S302, the transmitting device 112 will issue a request for a communication session to the communication server 116 (step S303). The transmitting device 112 will also provide the communication server 116 with some or all of the session ID information that was previously provided to the requesting device 108. Therefore, both devices 108, 112 will send the communication server 116 similar or identical information, which may include some or all of the session ID information. Even though both devices provide the communication server 116 with this information separately and independently, the fact that both devices have knowledge of the same session ID information allows the communication server 116 to negotiate the communication channel between the devices 108, 112. In other words, the communication server 116 uses the session ID information received from one or both devices to help select the appropriate communication channel/session, which may include a particular selection of data ports, IP addresses, or the like for use during the communication session.

The method continues with the communication server 116 providing an acknowledgement to the requesting device 108 that a corresponding response/request for a communication channel has been received at the communication server 116 by the transmitting device 112 (step S304). This results in the communication server 116 establishing a secure communication channel 304 between the devices 108, 112. Even though the communication channel 304 flows through the communication server 116 and communication network 104, the speed with which large data packets are transmitted over the communication channel 304 may be greater than the speed with which the same data packets are transmitted over wireless connection 120. Thus, the transmitting device 112 can begin or complete the transmission of data to the requesting device 108 via use of the communication channel 304 rather than relying on the slower and less desirable wireless connection 120.

Figure 4:
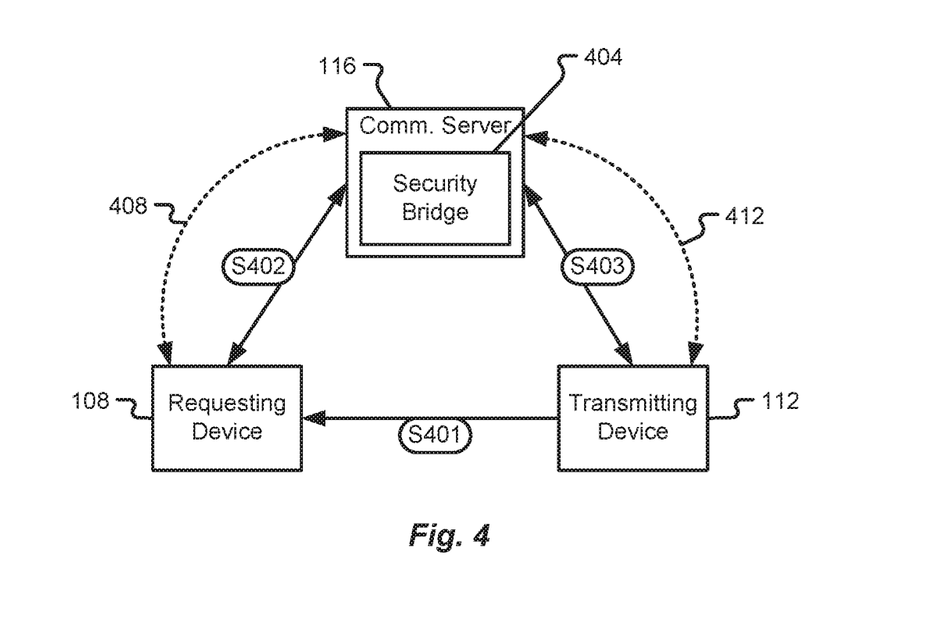
FIG. 4 is a block diagram depicting a second message flow in accordance with embodiments of the present disclosure.

With reference now to FIG. 4, an alternative message flow will be described in accordance with at least some embodiments of the present disclosure. The process begins with the devices 108, 112 being in communication via a direct wireless connection 120. The requesting device 108 or transmitting device 112 may then determine that the wireless connection 120 is less efficient than a possible online connection might be. Accordingly, the transmitting device 112 will transmit session ID information to the requesting device 108 via the wireless connection 120 (step S401). This particular step is similar to step S301.

The method continues with the requesting device 108 transmitting some or all of the session ID information to the communication server 116 (step S402). Simultaneous therewith, thereafter, or before step S402, the transmitting device 112 may independently provide some or all of its version of the session ID information to the communication server 116 (step S403). After the communication server 116 receives the information from both devices 108, 112, the communication server 116 is able to finalize the negotiation of a secure communication channel. As compared to the example of FIG. 3, the communication server 116 in this example may utilize a security bridge 404 to act as the end point of a mutual authentication/secure channel protocol. Thus, addressing information for the security bridge 404 is provided back to both devices 108, 112 and each device 108, 112 may establish independent communication channels with each devices 108, 112. In some embodiments, the communication server 116 may provide the requesting device 108 with one IP address associated with the security bridge 404 and the transmitting device 112 with a different IP address associated with the security bridge 404. Thus, the security bridge 404 may act as a terminal for both communication channels 408, 412 that are independently created with each device 108, 112. The security bridge 404 can then relay information received on one channel 408 to the other channel 412, or vice versa. The communication channels 408, 412 may utilize some type of Server Side SSL or a more sophisticated secure channel protocol. Once established, the communication channels 408, 412 can be used to carry data from the transmitting device 112 to the requesting device 108.

Figure 5A:
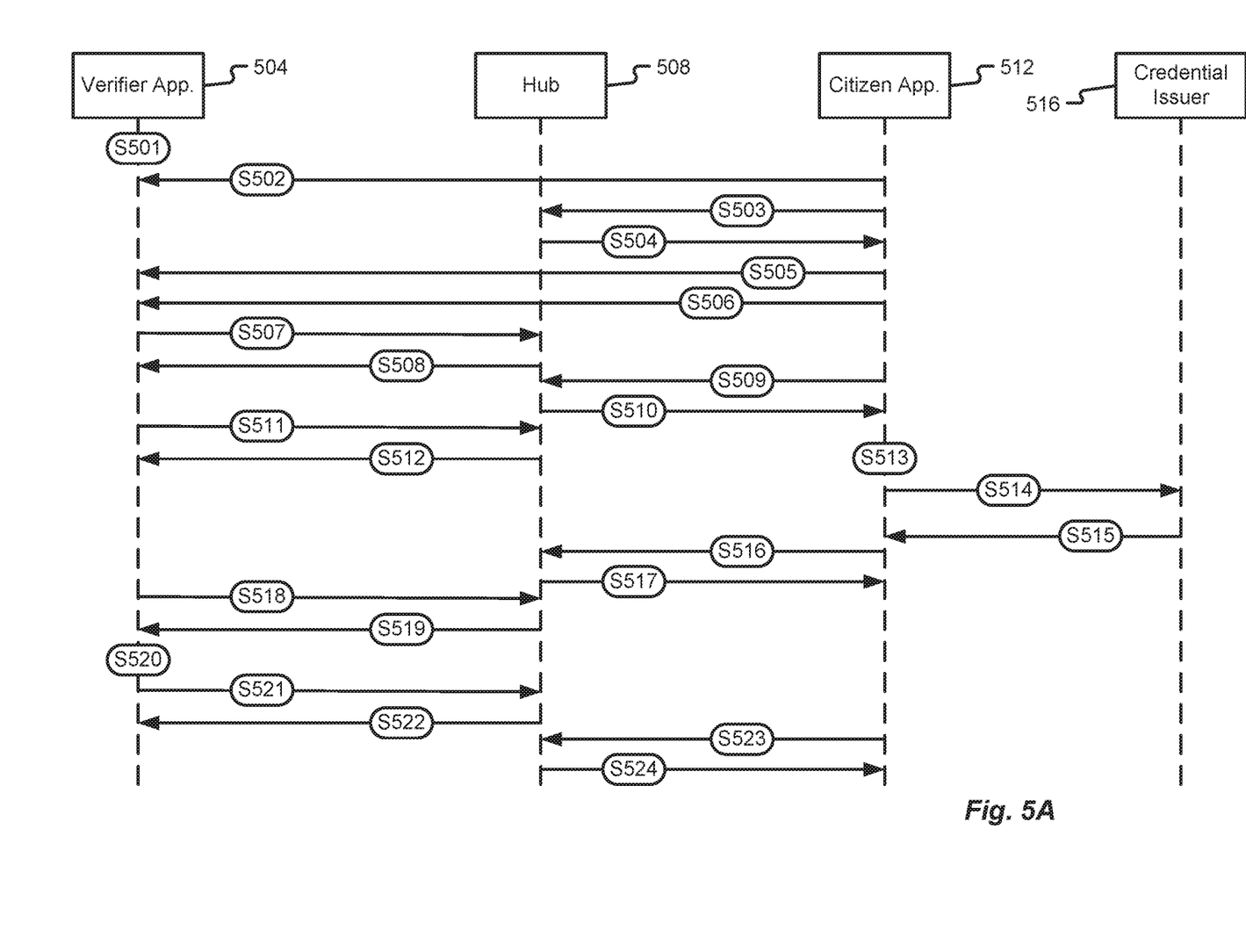
FIG. 5A is a first part of a message exchange diagram depicting device interactions in accordance with embodiments of the present disclosure.
Figure 5B:
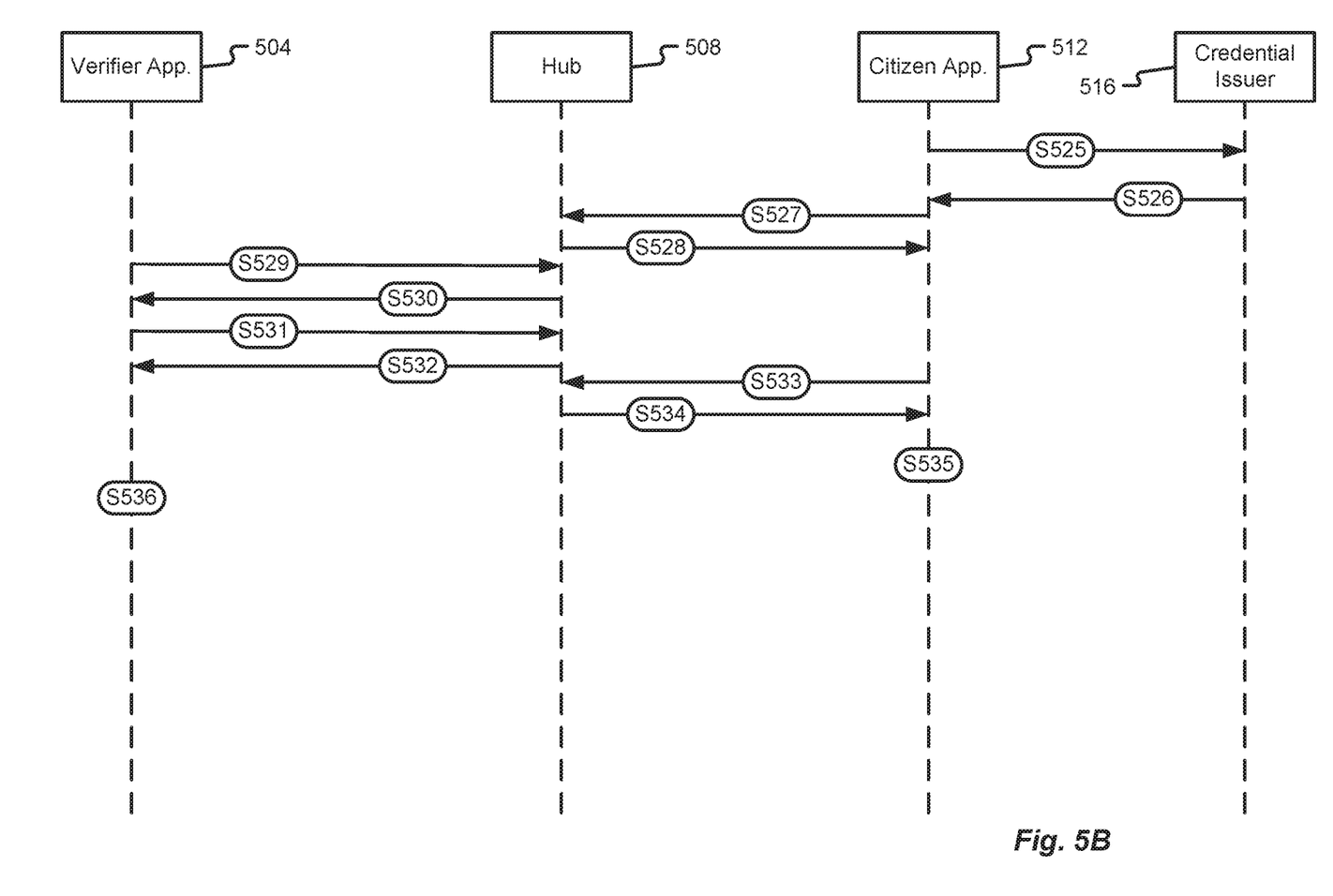
FIG. 5B is a second part of the message exchange diagram depicted in FIG. 5A.

With reference now to FIGS. 5A and 5B, additional details of a message exchange between various devices in the communication system 100 will be described in accordance with at least some embodiments of the present disclosure. The components used in this message exchange may include a verifier application 504 operating as a receiving device 108, a citizen application 512 operating as a transmitting device 112, a hub 508 operating as a communication server 116, and a credential issuer 516 that provides credential information (e.g., administers an electronic ID) to the citizen application 512.

The message exchange begins when the verifier application 504 starts broadcasting its Bluetooth pairing information (step S501). The method continues with the citizen application 512 responding to the broadcast with a release of its own Bluetooth ID, thereby facilitating a device-to-device connection (step S502). The citizen application 512 then issues a POST message to the hub 508, thereby identifying session ID information associated with the Bluetooth connection established between the verifier applicant 504 and citizen application 512 (step S503). The hub 508 responds with a session ID (step S504). The session ID provided to the citizen application 512 may include a unique identifier of the Bluetooth communication session and/or an identification of the citizen application 512 itself.

The citizen application 512 then provides the session ID information received from the hub 508 over to the verifier application 504 (step S505). In some embodiments, this session ID information is provided over the Bluetooth connection. The method continues with the citizen application 512 optionally disconnecting the Bluetooth connection with the verifier application 504 (step S506).

The verifier application 504 is now in possession of the session ID information and may be configured to provide some or all of that information to the hub 508 using a POST command (step S507). The hub 508 may respond with a 202 Accepted message (step S508). Thereafter, before, or simultaneous therewith, the citizen application 512 may provide its version of the session ID information back to the hub 508 (step S509). The hub 508 may respond with one or more APDUs that can be used to negotiate the creation of a secure online communication channel (step S510).

The method continues with the verifier application 504 providing the hub 508 with a GET command in which the session ID information is embedded therein (step S511). This GET command can be used as part of negotiating the secure communication channel as well. The hub 508 may respond to this GET command with a 404 Not Found message (step S512).

The citizen application 512 then performs a validation step (step S513). In this verification step, the citizen application 512 may validate one or more certificates received from the hub 508 and check if such certificates are active or revoked. This helps the citizen application 512 to ensure that the hub 508 is a trusted server. If validation is passed, the citizen application 512 may continue by providing one or more APDUs to the credential issuer (step S514). The credential issuer 516 may respond with more session ID information that can be used as part of negotiating and maintaining a secure communication channel between the verifier application 504 and citizen application 512 (step S515).

The citizen application then provides the information received from the credential issuer 516 to the hub 508 (step S516). This step may involve transmitting one or more POST messages to the hub 508. The hub 508 may respond to the POST messages with a 201 Response (step S517).

The method will continue with the verifier application 504 sending a GET message to the hub 508 (step S518). The GET command may include the session ID information previously provided to the hub 508 by the verifier application 504. The hub 508 may then respond with a 200 OK message that includes some or all of the information previously received from the citizen application 512 (e.g., an application ID and/or certificate information for the citizen application 512) (step S519).

The verifier application 504 then validates the certificate information for the citizen application 512 and checks if the certificate is revoked (step S520). If the certificate is valid and not revoked, then the verifier application 504 will respond with one or more POST messages that include the session ID information and a command to request information from the citizen application 512 (step S521). The hub 508 responds with a 202 Accepted message (step S522).

Thereafter, the hub 508 waits until a GET command is received from the citizen application 512 (step S523). Again, the GET command may include the session ID information. The hub 508 responds to the GET command with a 200 OK message and one or more get data commands in which additional data is requested by the hub 508 (step S524).

With reference to FIG. 5B, the message exchange continues with the citizen application 512 performing an additional exchange of information from the GET command with the credential issuer (step S525 and S526). The citizen application 512 then provides the requested information (e.g., some electronic ID information or the like that has been received from the credential issuer 516) back to the hub 508 (step S527). In some embodiments, this information is provided to the hub with one or more POST messages. The hub 508 responds with a 201 response (step S528). The verifier application 504 may then provide the hub 508 with a GET message to obtain the additional data from the hub 508 that was provided to the hub 508 by the citizen application 512 (step S529). The hub 508 may respond to the GET message with a 200 OK response that further contains the data received from the citizen application 512 (step S530). This process may continue until all data has been exchanged between the citizen application 512 and verifier application 504. Once the transfer of data has completed, the message exchange will continue with the verifier application 504 issuing a DELETE command that identifies the session ID to be discontinued (e.g., the session ID information originally used to establish the communication session) (step S531). The hub 508 responds to a 204 No Content response (step S532). This signifies the discontinuation of the online secure communication channel between the verifier application 504 and citizen application 512. At some later point in time the citizen application 512 may issue a further GET message (step S533) identifying the session ID. Because the session has been discontinued by the verifier application 504, the hub 508 will respond to the citizen application 512 with a 410 Gone response (step S534). The citizen application may then stop polling the hub 508 for further commands (step S535). The verifier application 504 may continue by performing a digital signature verification and chip authentication to ensure that the certificate included in the general authentication was the same as was included in the electronic ID information received from the citizen application 512 (step S536). If verified, the verifier application 504 may further render some or all of the data received from the citizen application 512 on a user output of the requesting device 108 on which the verifier application 504 is running.

Figure 6:
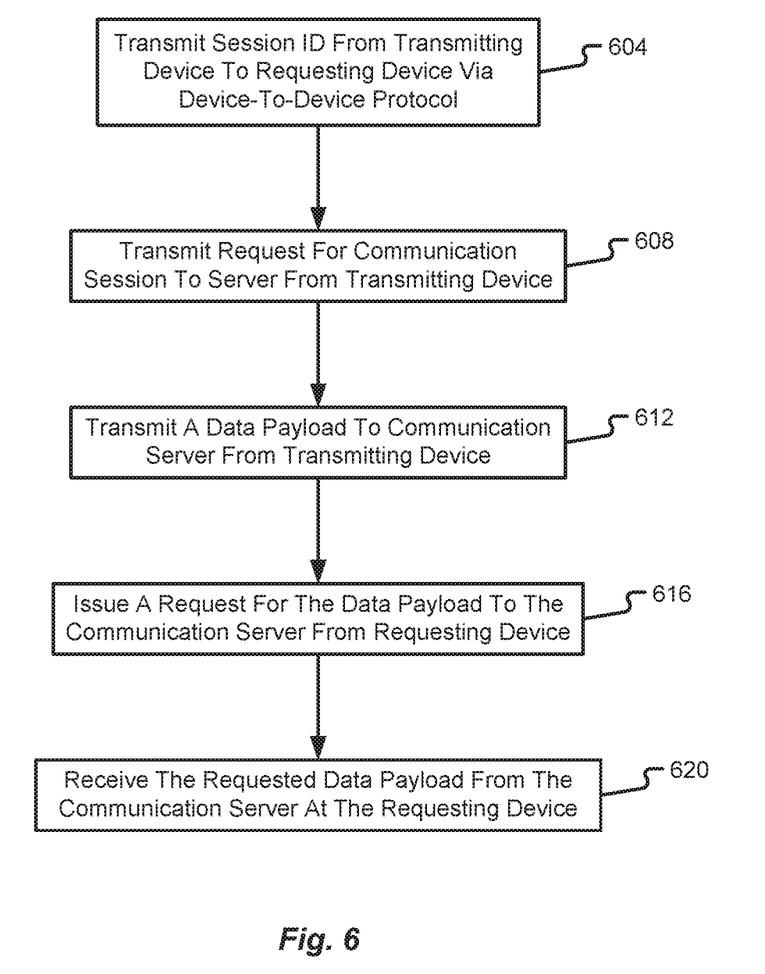
FIG. 6 is a flow diagram depicting a method for exchanging data between a transmitting device and a requesting device in accordance with embodiments of the present disclosure.

With reference now to FIG. 6, additional details of a method for exchanging data between a transmitting device and a requesting device will be described in accordance with at least some embodiments of the present disclosure. The method begins with the transmitting device first transmitting session ID information to the requesting device via the device-to-device communication protocol (step 604). In some embodiments, the session ID information is communicated to the requesting device via BLE, NFC, or the like.

The method continues with the transmitting device transmitting a request for a communication session to a communication server (step 608). In some embodiments, this request may include some or all of the session ID information that was previously provided to the requesting device; however, the session ID information is provided to the communication server via a communication network connection.

Thereafter, the transmitting device may transmit a data payload to the communication server (step 612). In some embodiments, the data payload may include some or all of the information that is desired to be shared with the requesting device. As a non-limiting example, the data payload may include electronic ID information. At this point, the communication server is in possession of the data payload transmitted by the transmitting device. The communication server will retain this data payload until an appropriately-formatter request is received from the requesting device.

The method continues when the requesting device issues a request for the data payload to the communication server (step 616). In some embodiments, the request for the data payload may be transmitted using an IP-based communication format and the request may include some or all of the session ID information that was previously received from the transmitting device via the device-to-device protocol.

Upon determining that the request received from the requesting device contains the appropriate information (e.g., valid session ID information and a valid/non-revoked certificate of authentication), the communication server responds by transmitting some or all of the data payload to the requesting device (step 620). This effectively enables the transmitting device to utilize an online secure communication channel that passes through the communication server rather than solely relying on the device-to-device connection to pass the data payload to the requesting device.

As can be seen from the above description, the method disclosed herein is useful for improving the efficiency with which data is shared between devices. Specific details were given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

The exemplary systems and methods of this disclosure have been described in relation to mobile devices, systems, and methods in a communication system having two mobile device. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should, however, be appreciated that the present disclosure may be practiced in a variety of ways beyond the specific detail set forth herein.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

What is claimed is:

1. A method for exchanging data between a transmitting device and a requesting device, the method comprising:
   determining that proximity-based device-to-device communication between the transmitting device and the requesting device is slower than a desired threshold for exchanging a data payload;
   the transmitting device transmitting a session identifier to the requesting device via a proximity-based device-to-device communication protocol;

the transmitting device transmitting a request for a communication session to a communication server, wherein the request for the communication session includes the session identifier;

the transmitting device transmitting the data payload to the communication server via the communication session;

the requesting device issuing a request for the data payload to the communication server, wherein the request is formatted in an Internet Protocol (IP) format and includes the session identifier as a mechanism for identifying the data payload; and the requesting device receiving the requested data payload from the communication server in response to the communication server confirming that the session identifier received from the requesting device matches the session identifier received from the transmitting device.

2. The method of claim 1, further comprising:
the transmitting device also transmitting the data payload directly to the requesting device via the proximity based device-to-device communication protocol.

3. The method of claim 1, wherein the session identifier is transmitted to the requesting device in an Application Protocol Data Unit (AMU).

4. The method of claim 1, wherein the transmitting device and the requesting device both comprise cellular communication capabilities.

5. The method of claim 1, wherein the proximity-based device-to-device communication protocol comprises at least one of Near Field Communications (NFC) and Bluetooth Low Energy (BLE).

6. The method of claim 1, wherein the request issued by the requesting device comprises an HTTP GET request.

7. The method of claim 1, wherein the session identifier comprises a random nonce value generated by the transmitting device.

8. The method of claim 7, wherein the random nonce value identifies the communication session between the transmitting device and the communication server as well as between the requesting device and the communication server thereby creating a secure communication channel between the transmitting device and the requesting device through the communication server.

9. The method of claim 1, further comprising:
the transmitting device polling the communication server to receive the session identifier received at the communication server from the requesting device, thereby confirming that the communication server received the session identifier from the requesting device that is communicating with the transmitting device.

10. The method of claim 1, wherein the data payload comprises an electronic driver's license.

11. The method of claim 1, further comprising:
generating a human-readable version of the session identifier for display on the transmitting device.

12. A communication server comprising a microprocessor and computer-readable instructions stored in memory that are executable by the microprocessor, wherein the instructions stored in memory, when executed by the microprocessor, enable the communication server to:
receive a request for a communication session from a transmitting device, wherein the request for the communication session includes a session identifier previously shared between the transmitting device and a requesting device via a proximity-based device-to-device protocol following a determination that proximity-based device-to-device communication between the transmitting device and the requesting device is slower than a desired threshold for exchanging a data payload;

receive the data payload from the transmitting device, wherein the data payload is received along with the session identifier;

store the data payload in memory until a request for the data payload is received from the requesting device, wherein the request is formatted in an Internet Protocol (IP) format and includes the session identifier as a mechanism for identifying the data payload;

verifying that the request for the data payload contains the valid session identifier; and in response to verifying that the request for the data payload contains the valid session identifier, transmitting the data payload to the requesting device in one or more IP packets.

13. The communication server of claim 12, wherein the data payload and the request for the data payload are received using a hypertext transport protocol.

14. The communication server of claim 12, wherein the proximity-based device-to-device protocol comprises Bluetooth.

15. The communication server of claim 12, wherein the proximity-based device-to-device protocol comprises Near Field Communications (NFC).

16. The communication server of claim 12, wherein the session identifier comprises a random nonce value generated by the transmitting device and wherein the random nonce value identifies the communication session between the transmitting device and the communication server as well as between the requesting device and the communication server thereby creating a secure communication channel between the transmitting device and the requesting device through the communication server.

17. The communication server of claim 12, wherein the data payload comprises information obtained from an electronic driver's license.

18. The communication server of claim 17, wherein the data payload includes a certificate issued by a credential issuer and wherein the certificate is also provided to the requesting device to enable the requesting device to validate that the data payload and certificate are issued by the credential issuer and the certificate is not revoked.

19. A communication system, comprising:
a transmitting device having at least one antenna that facilitates direct, proximity-based device-to-device communications;

a requesting device having at least one antenna that also facilitates direct, proximity-based device-to-device communications, wherein the transmitting device and requesting device are in communication with one another via a first wireless, proximity-based connection and wherein the transmitting device shares a session identifier with the requesting device via the first wireless, proximity-based connection; and a communication server that, following a determination that communication between the transmitting device and the requesting device over the first wireless, proximity-based connection is slower than a desired threshold for exchanging a data payload, establishes an online secure communication channel between the transmitting device and requesting device by using the session identifier as a mechanism for enabling the transmitting device and requesting device to independently negotiate to the online secure communication channel and wherein the online secure communication channel is used to exchange the data payload between the transmitting device and requesting device rather than requiring the transmitting device and requesting device to use the first, proximity-based wireless connection to exchange the data payload.

20. The communication system of claim 19, wherein the session identifier comprises a random nonce value generated by the transmitting device and wherein the random nonce value identifies the communication session between the transmitting device and the communication server as well as between the requesting device and the communication server thereby creating a secure communication channel between the transmitting device and the requesting device through the communication server.

\* \* \* \* \*